United States Patent
Ligoci, Sr. et al.

(10) Patent No.: US 6,873,246 B1
(45) Date of Patent: Mar. 29, 2005

(54) FREQUENCY ACTIVATED NEUTRALIZING GENERATOR SYSTEM

(76) Inventors: Joseph P. Ligoci, Sr., 8045 Pickett La., Cicero, NY (US) 13039; Elias J. Goletsas, 176 E. Molloy Rd., Mattydale, NY (US) 13211

(*) Notice: Subject to any disclaimer, the term of this patent is extended or adjusted under 35 U.S.C. 154(b) by 168 days.

(21) Appl. No.: 09/663,155

(22) Filed: Sep. 15, 2000

Related U.S. Application Data

(63) Continuation-in-part of application No. 09/031,474, filed on Feb. 26, 1998, now abandoned.

(51) Int. Cl.$^7$ .............................................. G05B 19/00
(52) U.S. Cl. .............. 340/5.31; 340/426.1; 340/426.11; 340/426.16; 340/7.1; 340/825.69; 340/5.32; 340/5.33; 340/425.5; 342/44; 123/179.2; 123/179.4
(58) Field of Search ............................. 340/5.31, 5.32, 340/5.33, 425.5, 426.1, 426.11, 426.16, 825.69, 7.1, 426; 342/44; 123/179.2, 179.4

(56) References Cited

U.S. PATENT DOCUMENTS

| | | |
|---|---|---|
| 4,001,822 A | 1/1977 | Sterzer |
| 4,619,231 A | 10/1986 | Stolar et al. |
| 4,878,050 A | 10/1989 | Kelley |
| D337,066 S | 7/1993 | Thompson |
| 5,276,728 A | 1/1994 | Pagliaroli et al. |
| 5,293,527 A | 3/1994 | Sutton et al. |
| 5,398,190 A | 3/1995 | Wortham |
| 5,479,157 A | 12/1995 | Suman et al. .............. 340/5.28 |
| 5,490,200 A | 2/1996 | Snyder et al. ............... 340/7.1 |
| 5,513,244 A | 4/1996 | Joao et al. |
| 5,559,491 A * | 9/1996 | Stadler ....................... 340/426 |
| 5,729,192 A | 3/1998 | Badger |
| 5,835,868 A | 11/1998 | McElroy et al. |
| 5,861,799 A | 1/1999 | Szwed |
| 5,939,975 A | 8/1999 | Tsuria et al. |
| 6,157,317 A * | 12/2000 | Walker ....................... 340/7.1 |

* cited by examiner

Primary Examiner—Ario Etienne
Assistant Examiner—Yves Dalencourt
(74) Attorney, Agent, or Firm—Lawrence P. Trapani

(57) ABSTRACT

The vehicle disabling system includes a vehicle control unit for positioning in a vehicle with a transceiver for transmitting and receiving signals to receive an inquiry signal and transmit an identification code upon the receipt of the inquiry signal. A central database station includes memory for storing a plurality of identification codes of vehicle control units. An authorization code is associated each identification code. A mobile law enforcement unit is positionable in a law enforcement vehicle, and includes a transceiver for transmitting and receiving signals to transmit the inquiry signal to a vehicle control unit. The law enforcement unit receives an identification code from the vehicle control unit and transmits the identification code to central database station. The law enforcement unit transmits the stop signal with the authorization code to the vehicle control unit upon receiving the authorization code from the central database station.

20 Claims, 7 Drawing Sheets

US 6,873,246 B1

FREQUENCY ACTIVATED NEUTRALIZING GENERATOR SYSTEM

CROSS-REFERENCE TO RELATED APPLICATIONS

This application is a continuation-in-part of U.S. application Ser. No. 09/031,474, filed Feb. 26, 1998, now abandoned.

BACKGROUND OF THE INVENTION

1. Field of the Invention

The present invention relates to vehicular disabling systems and more particularly pertains to a new vehicle verifying and disabling system for disabling a vehicle attempting to elude law enforcement officials.

2. Description of the Prior Art

The use of vehicular disabling systems is known in the prior art. More specifically, vehicular disabling systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicular disabling systems include U.S. Pat. No. 5,939,975, U.S. Pat. No. 5,835,868, U.S. Pat. No. 5,729,192, U.S. Pat. No. 5,513,244, U.S. Pat. No. 5,293,527; U.S. Pat. No. 5,276,728; U.S. Pat. No. 4,619,231; U.S. Pat. No. 4,878,050; U.S. Pat. No. 5,398,190; and U.S. Pat. No. Des. 337,066.

SUMMARY OF THE INVENTION

In view of the foregoing disadvantages inherent in the known types of vehicular disabling systems now present in the prior art, the present invention provides a new vehicle verifying and disabling system construction wherein the same can be utilized for disabling a vehicle attempting to elude law enforcement officials.

The general purpose of the present invention, which will be described subsequently in greater detail, is to provide a new vehicle verifying and disabling system apparatus and method which has many of the advantages of the vehicular disabling systems mentioned heretofore and many novel features that result in a new vehicle verifying and disabling system which is not anticipated, rendered obvious, suggested, or even implied by any of the prior art vehicular disabling systems, either alone or in any combination thereof.

To attain this, the present invention generally comprises a vehicle control unit for positioning in a vehicle. The vehicle control unit includes a transceiver for transmitting and receiving signals via free space. The transceiver is adapted to receive an inquiry signal and transmit an identification code upon the receipt of the inquiry signal. A central database station includes memory for storing a plurality of identification codes of vehicle control units. An authorization code is associated in the memory with each of the identification codes of the vehicle control units. A mobile law enforcement unit is provided for positioning in a law enforcement vehicle. The law enforcement unit includes a transceiver for transmitting and receiving signals via free space. The law enforcement unit is adapted to transmit the inquiry signal to a vehicle control unit. The law enforcement unit is adapted to receive an identification code from the vehicle control unit and transmit the identification code to central database station. The law enforcement unit is adapted to transmit the stop signal with the authorization code via free space to the vehicle control unit upon the receipt of the authorization code from the central database station.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle verifying and disabling system apparatus and method which has many of the advantages of the vehicular disabling systems mentioned heretofore and many novel features that result in a new vehicle verifying and disabling system which is not anticipated, rendered obvious, suggested, or even implied by any of the prior art vehicular disabling systems, either alone or in any combination thereof.

It is another object of the present invention to provide a new vehicle verifying and disabling system which may be easily and efficiently manufactured and marketed.

It is a further object of the present invention to provide a new vehicle verifying and disabling system which is of a durable and reliable construction.

An even further object of the present invention is to provide a new vehicle verifying and disabling system which is susceptible of a low cost of manufacture with regard to both materials and labor, and which accordingly is then susceptible of low prices of sale to the consuming public, thereby making such vehicle verifying and disabling system economically available to the buying public.

Still yet another object of the present invention is to provide a new vehicle verifying and disabling system which provides in the apparatuses and methods of the prior art some of the advantages thereof, while simultaneously overcoming some of the disadvantages normally associated therewith.

Still another object of the present invention is to provide a new vehicle verifying and disabling system for disabling a vehicle attempting to elude law enforcement officials.

Even still another object of the present invention is to provide a new vehicle verifying and disabling system that includes a vehicle control unit for positioning in a vehicle. The vehicle control unit includes a transceiver for transmitting and receiving signals via free space. The transceiver is adapted to receive an inquiry signal and transmit an identification code upon the receipt of the inquiry signal. A central database station includes memory for storing a plurality of identification codes of vehicle control units. An authorization code is associated in the memory with each of the identification codes of the vehicle control units. A mobile law enforcement unit is provided for positioning in a law enforcement vehicle. The law enforcement unit includes a transceiver for transmitting and receiving signals via free space. The law enforcement unit is adapted to transmit the inquiry signal to a vehicle control unit. The law enforcement unit is adapted to receive an identification code from the vehicle control unit and transmit the identification code to central database station. The law enforcement unit is adapted to transmit the stop signal with the authorization code via free space to the vehicle control unit upon the receipt of the authorization code from the central database station.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
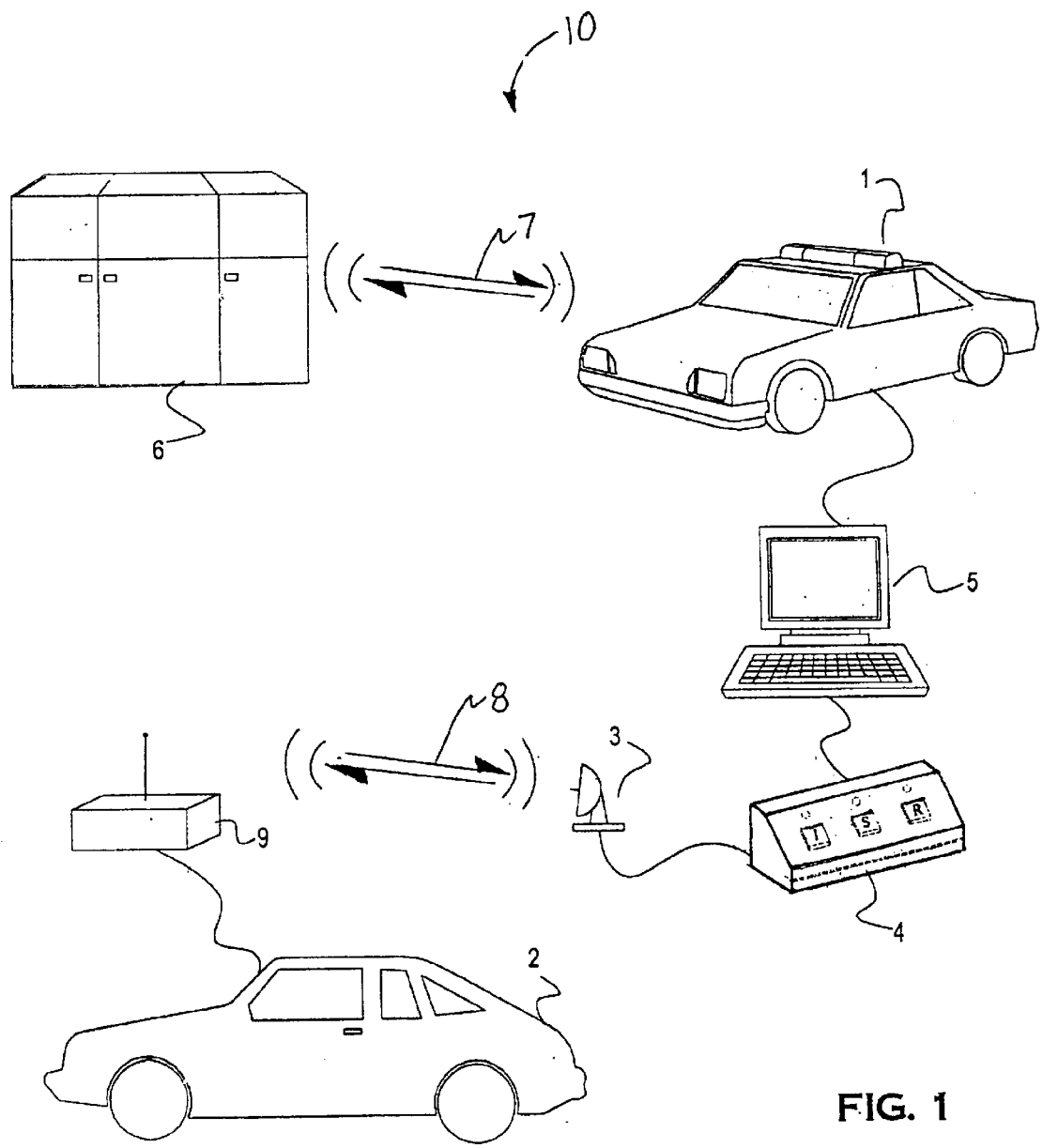
FIG. 1 is a schematic overview of the operation of the system of the present invention.
Figure 2:
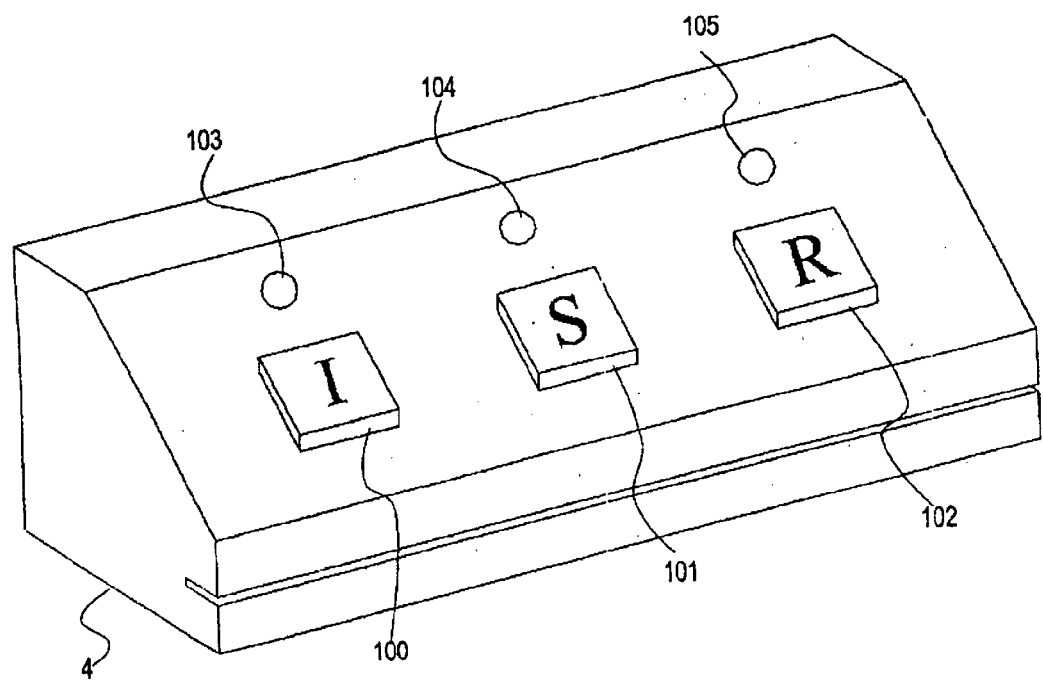
FIG. 2 is a schematic perspective view of the Law Enforcement Unit (LEU) of the invention.

With reference now to the drawings, and in particular to FIGS. 1 through 7 thereof, a new vehicle verifying and disabling system embodying the principles and concepts of the present invention and generally designated by the reference numeral 10 will be described.

The present invention allows a law enforcement officer to remotely disable and enable a suspect vehicle, such as an automobile, boat, snowmobile, motorcycle, aircraft, and any other motor vehicle.

A police vehicle 1 is shown to be equipped with a standard Mobile Police Computer 5 which is interfaced through a serial port to the Law Enforcement Unit (LEU) module 4 which includes a directional antenna 3 (see FIG. 1). When the law enforcement officer sees a suspect vehicle 2 behaving erratically or breaking the law, he presses the INQUIRE button 100 (see FIG. 2) on his LEU module 4. This causes the LEU to transmit an INQUIRY signal 8 to the Vehicle Control Unit (VCU) 9 in the suspect vehicle 2. Upon receipt of the INQUIRY signal 8, the VCU 9 returns an ID code of the suspect vehicle 2. The LEU relays the ID code to the Central Station Computer 6 using the existing link 7 between the Mobile Police Computer 5 and the Central Station Computer 6. The Central Station Computer looks up the ID code in a Hot Sheet Database, a Motor Vehicle Database, a Vehicle Authorization Database and any other appropriate databases and transmits the Vehicle Authorization Code 106 (which is used as a password to control the suspect vehicle 2) to the Mobile Police Computer which relays the Vehicle Authorization Code to the LEU which uses the code with the INQUIRY and STOP commands to stop the suspect vehicle.

Security is maintained by encrypting the Vehicle Authorization Code in nonvolatile Random Access Memory (RAM) 9 on the VCU at the time it is installed in the vehicle. This Vehicle Authorization Code is the same one that is stored on the Central Station Computer in a large database for all VCUs (and the associated vehicle) manufactured. The data transmission between the suspect vehicle 2 and the police vehicle 1 as well as data transmission between the police vehicle and the Central Station Computer 6 is encrypted using private key methods to ensure the security of the entire data stream. Theft of an LEU or an LEU and a VCU does not violate the security of the system because the actual Vehicle Authorization Codes reside only on the Central Station Computer 6 database in contrast to other known systems which use algorithmically-derived authorization codes.

A preferred LEU module 4 (see FIG. 2) includes the INQUIRE, STOP and RESET buttons of the module. The module 4 is the interface between the law enforcement officer and the LEU 4. When a suspect vehicle is behaving erratically or breaking the law, the officer first presses the INQUIRE button 100, and the INQUIRE LED 103 will then begin blinking. Once the Central Station Computer 6 returns the Vehicle Authorization Code of the suspect vehicle, the INQUIRE LED 103 will illuminate. It is possible for the Central Station Computer to return multiple authorization codes, one for each vehicle within the LEU's transmitting and receiving range, and will all be displayed on the mobile computer 5. For this occurrence, the officer will press the INQUIRE button 100 until the suspect vehicle is highlighted in the display, the most likely suspect vehicle will be automatically highlighted. Each time a new vehicle is highlighted in the Mobile Police Computer's display, an INQUIRE command is transmitted to that vehicle's VCU which will activate that vehicle's flasher light circuit, as an easy visual acknowledgment to the police officer showing which vehicle is active in the Mobile Police Computer. When the correct vehicle is highlighted, the police officer will press the STOP button 101, the LEU will transmit the STOP command and the STOP LED will begin flashing. The VCU then transmits an acknowledgment to the STOP command and then activates the suspect vehicle's horn and puts the vehicle's engine in idle. When the LEU receives the acknowledgment from the VCU, the STOP LED 104 will turn solid. Once the suspect vehicle is immobilized and the officer has the situation in control, the officer can deactivate the suspect vehicle's horn by pressing the RESET button 102, the RESET LED 105 will then start flashing. Finally, when the situation is over, the police officer then presses the RESET button 102 one last time to deactivate the suspect vehicle from the system. User configurable voice status messages will be output from the LEU each time a vehicle is inquired, stopped, or reset allowing the police officer to keep his eyes on the road at all times.

Figure 3:
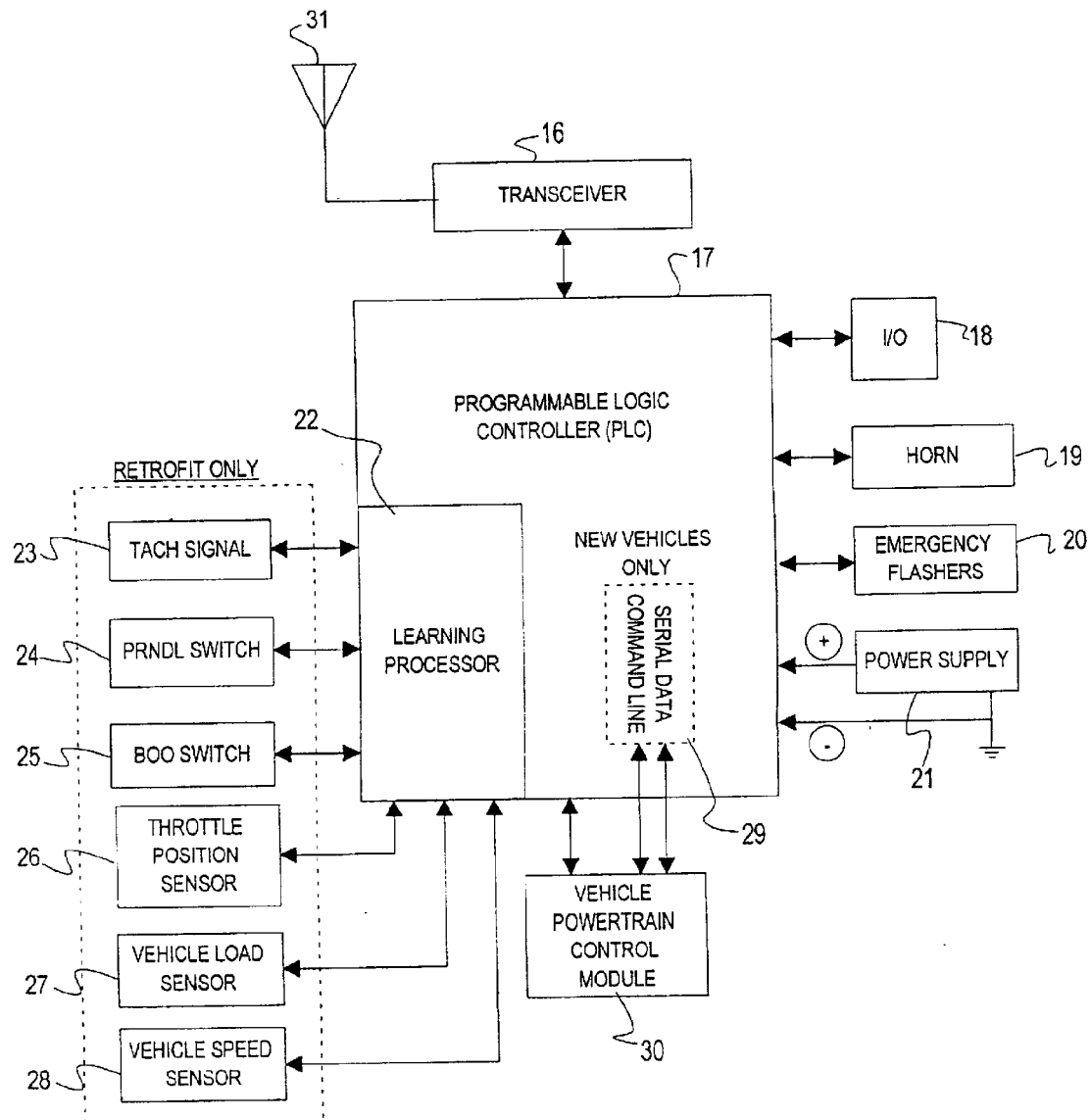
FIG. 3 is a schematic block diagram of the Vehicle Control Unit (VCU).

A preferred vehicle control unit (VCU) is shown in FIG. 3. The VCU is made up of a programmable logic controller 17 linked to a transceiver 16 and an antenna 31. The power supply 21 draws power from the vehicle's battery. Control of the vehicle is gained through the emergency flasher control 20, the horn controls 19, and depending if the VCU is installed on a new vehicle in the factory or if it is installed in a used vehicle as a retrofit, there are different controls 40 for each. In new vehicles, the serial data line and the command line 29 of the PLC communicate with the vehicle's Powertrain Control Module (PCM) 30. The serial data line is an encrypted digital pulse train that the vehicle Powertrain Control Module (PCM) looks for at all times. The loss of the signal will cause the vehicle to return to idle and illuminate the check engine light of the vehicle as an anti-tamper feature. The command line signal is an analog or digital signal to the PCM, which will return the vehicle to idle. The command line can be enabled by a command from the LEU or by the owner of the vehicle, using a keypad access code. The retrofit controls are the tachometer sensor 23, the PRNDL switch 24, the Brake On/Off (BOO) switch 25, the Throttle Position Sensor 26, the Vehicle Load Sensor (VLS) 27, and the Vehicle Speed Sensor 28. The tachometer sensor 23 produces an analog or digital signal representing the engine speed in revolutions per minute. The lowest tachometer signal captured during the snapshot phase. The PRNDL switch 24 produces an analog or digital signal identifying the gear position of the vehicle (i.e., Park, Reverse, Neutral, Drive, or Low gear), and is also used as a necessary condition to be met prior to the snapshot being taken. The BOO switch 25 produces an analog signal that confirms vehicle brake application (e.g., pressing on the brake pedal), and is used as one of the conditions that must be met before the learning processor 22 snapshots the TPS (throttle position sensor) 26 and the Load Sensor 27. The throttle position sensor 26 produces an analog or digital signal representing the vehicle operator's acceleration intentions. The Vehicle Load Sensor 27 produces an analog or digital representation of the load placed on the engine, and may measure airflow in grams per second or in engine vacuum (e.g., absolute pressure). The vehicle speed sensor (VSS) 28 produces an analog or digital signal representing vehicle speed and may be used in conjunction with, or in place of, the signal of the BOO sensor 25, and this will be critical in determining the at rest, in gear parameters of the Throttle Position Sensor 26 and the Engine Load Sensor 27. All of these retrofit items feed into the learning processor 22 portion of the PLC 17. The Learning Processor 22 takes a snapshot view at different instances of the vehicle's operation. Once the Learning Processor 22 has acquired enough data regarding the vehicle's sensor levels, the PLC 17 can communicate with the vehicle's Powertrain Control Module 30, and can idle the vehicle once enabled.

Figure 4:
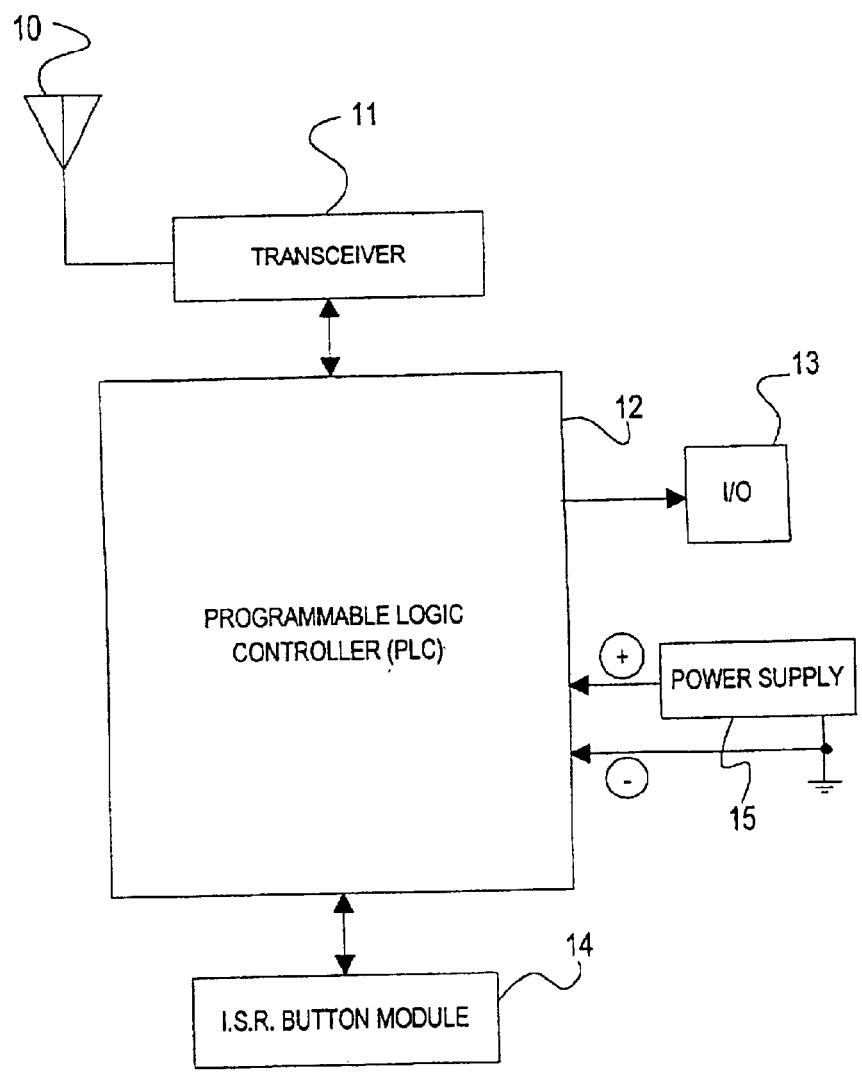
FIG. 4 is a schematic block diagram of the Law Enforcement Unit of the invention.

A preferred Law Enforcement Unit (LEU) is shown in FIG. 4. The LEU is made up of a Programmable Logic Controller 12 linked to a transceiver 11, an antenna 10, and a power supply 15 to feed the entire circuit. The LEU communicates with the Mobile Police Computer via an Input/Output Port 13 and interfaces with the computer 5 shown in FIG. 1.

Figure 5A:
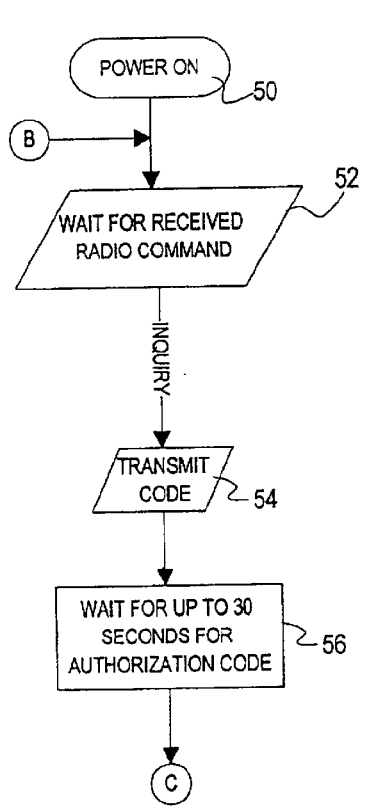
FIGS. 5A and 5B are flow diagrams of the operation of the Vehicle Control Unit (VCU).
Figure 5B:
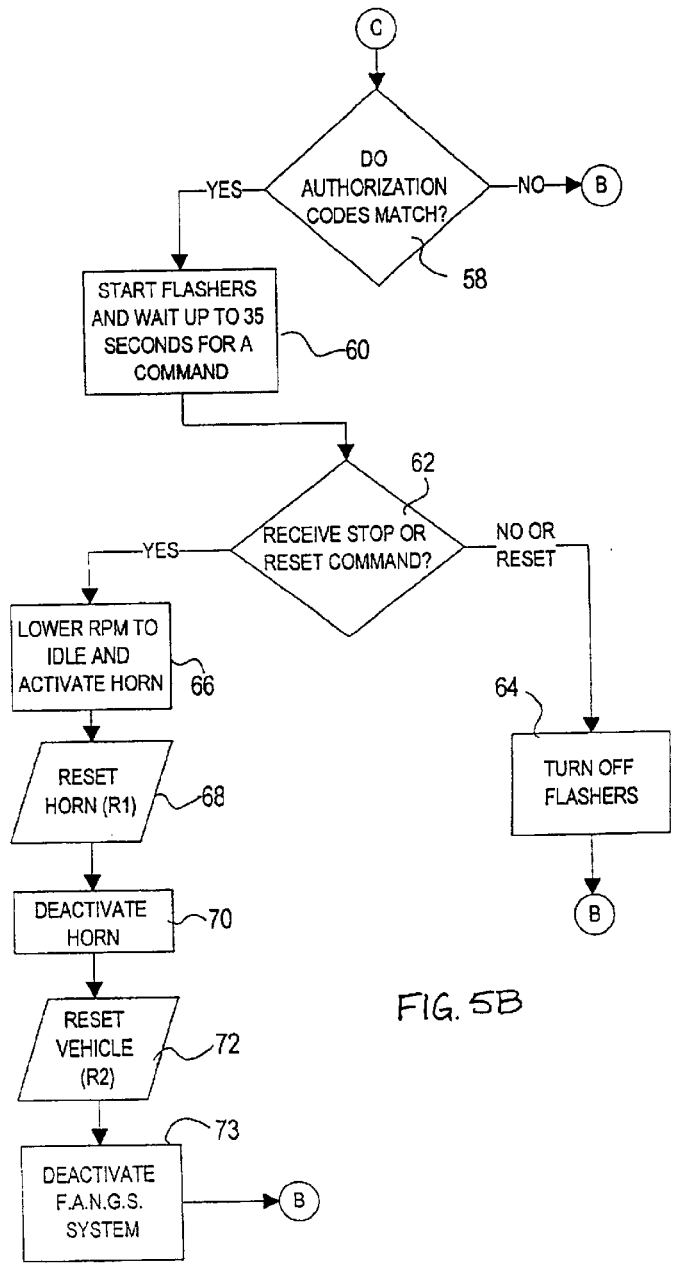
Figure 6:
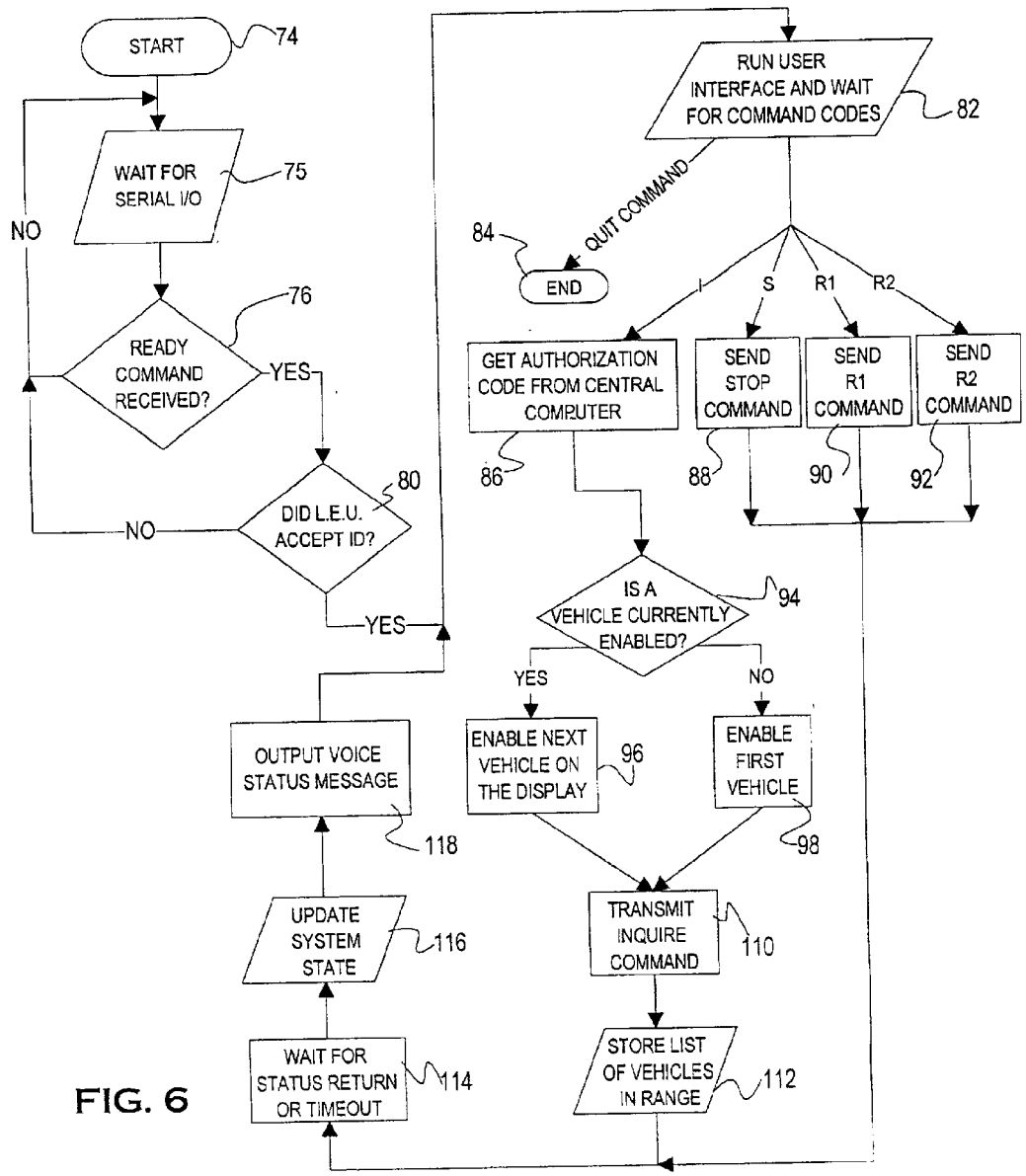
FIG. 6 is a flow diagram of the operation of the Law Enforcement Unit (LEU) and the Central Station Computer (CSC).
Figure 7:
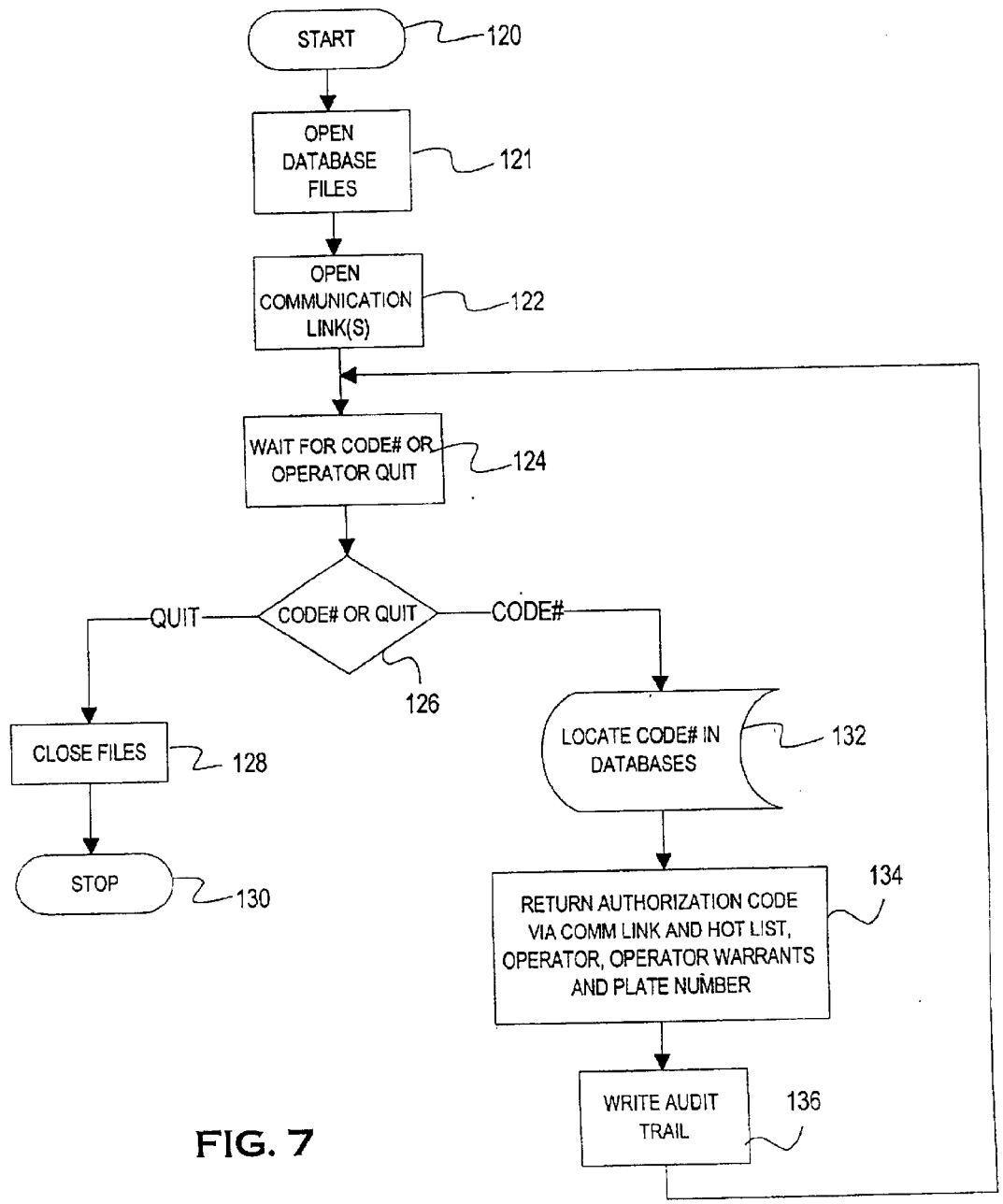
FIG. 7 is a flow diagram of the operation of the Central Station Computer (CSC).

The operation of the vehicle control unit (VCU) is illustrated in FIG. 5. After the unit is powered on (box 50), the unit goes into a wait state (box 52). Upon reception of the Inquiry Command (box 54), the system transmits the vehicle ID code to the LEU. The VCU will wait up to 30 seconds after the Inquiry Command for the authorization code to be sent by the LEU to the VCU as a "lock-on" acknowledgment (box 56). If a valid authorization code is received (box 58), the vehicle's flasher lights (e.g., the turn signal lights) are turned on (box 60) and the VCU will wait for a STOP or RESET command. If no command is received, or a RESET command is received, the flashers are turned off (box 64) and the system is RESET to an initial state. If a STOP command is received, then the vehicle is put into an idle state. This will cause the vehicle to coast to a stop. The horn may be activated in an oscillatory fashion (e.g., turned on and off in approximately 1 second intervals). When an R1 (First Reset) command is received (box 68), the horn is turned off (box 70) to allow the officer to question the driver. When an R2 (Second Reset) command is received (box 72), the system is reset and the vehicle is again fully operational (box 73).

After power up (see FIG. 6) of the LEU module, the LEU module waits for a serial authorization code (box 75) from the Mobile Police Computer 5 (which may be solicited from various combinations of inputs, e.g., swipe card, pin number, fingerprint sensor, retinal scan). If data is received (box 76), then the local authorization code stored in the LEU chip is compared with the received authorization code and validated (box 80). If the authorization code is proper, then the user interface is started, and awaits commands (box 82) from the LEU module. Upon receipt of an INQUIRE command, the LEU sends an ID code from the Vehicle Control Unit (of the suspect vehicle) to the Central Station Computer 6 and waits for the Vehicle Authorization Code to be sent back over a secure interface from the Central Station Computer (box 86). If the vehicle has already been acquired, the flashers of the vehicle will already be blinking (box 94), and the LEU will switch to another vehicle (e.g., the next closest vehicle in signal strength) as the current vehicle (box 96). Otherwise, it will select the closest vehicle as the current vehicle 98. Then the INQUIRY command with authorization code will be sent to the suspect vehicle (box 110) to actually "lock-on" and start the flashers of the suspect vehicle flashing. The LEU will rescan the current area and update the list of vehicles in range (box 112). Within 30 seconds, the system will wait for a status return from the suspect vehicle's VCU to acknowledge that the system has indeed been acquired (box 114). Base on that response, the system's state will be updated (box 116) and a voice status message will be played (box 118).

An additional software module (see FIG. 7) may be required at the Central Station Computer 6 to process authorization checks from the various LEUs, and simultaneously screen the ID code of the vehicle and the operator of the vehicle for violations. Upon initiation (box 120), the software opens the appropriate databases (box 121) and communication links (box 122) to the wireless network and waits for an ID code check request (box 124). Upon reception of an ID code (box 126), the code number is located in the appropriate databases (box 132) and the Vehicle Authorization Code and other pertinent information is transmitted back to the requesting Mobile Police Computer (box 134)

and an audit trail is created (box 136). The computer program may be terminated for maintenance purposes or other reasons (boxes 128, 130).

The data sent back to the requesting law enforcement patrol can be such information as: a stolen vehicle automated "HOT SHEET" scan, an operator description/warrant check, a visual check to match license plate with automated license plate information and a check of vehicle registration information.

Possible uses of the present invention includes rental fleets, corporate fleets, police vehicles, commercial vehicles, and vehicles in urban, high-theft-rate areas. Governments could require mandatory use for drivers with D.W.I. records. Insurance companies would be motivated to give discounts to customers who have the present invention installed on their vehicles, because this would diminish the chances of auto theft and auto damage claims due to accidents in high-speed chases. Foreign governments with societies that are more restrictive than the U.S. might require the device for all newly manufactured vehicles (i.e., Singapore).

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method of verifying and disabling a suspect vehicle, said method employing a central database station, a law enforcement unit associated with a law enforcement officer, and a vehicle control unit contained within the suspect vehicle, said method comprising the steps of:
   (a) the law enforcement officer observing the suspect vehicle;
   (b) the law enforcement officer transmitting an inquiry signal from the law enforcement unit to the vehicle control unit;
   (c) transmitting an identification code that is associated with the suspect vehicle, from the vehicle control unit in response to the inquiry signal;
   (d) receiving the identification code at the central database station, the identification code being associated with a first vehicle authorization code;
   (e) identifying the first vehicle authorization code associated with the identification code;
   (f) transmitting the first vehicle authorization code to the vehicle control unit;
   (g) in the vehicle control unit, comparing the first vehicle authorization code with a second vehicle authorization code pre-stored in the vehicle control unit;
   (h) generating an authorization acknowledgment at the suspect vehicle if there is a match between the first vehicle authorization code and the second vehicle authorization code;
   (i) enabling the vehicle control unit to receive a stop command signal if there is a match between the first vehicle authorization code and the second vehicle authorization code;
   (j) the law enforcement officer observing the authorization acknowledgment;
   (k) the law enforcement officer transmitting a stop command signal from the law enforcement unit in response to the authorization acknowledgment;
   (l) receiving the stop command signal at the vehicle control unit; and
   (m) disabling operation of the suspect vehicle in response to the stop command signal.

2. The method of claim 1, wherein said step (d) includes using a lookup table to identify the vehicle authorization code from the received identification code.

3. The method of claim 1, wherein said step (f) includes transmitting the vehicle authorization code to the law enforcement unit, and then transmitting the vehicle authorization code from the law enforcement unit to the vehicle control unit.

4. The method of claim 1, wherein the suspect vehicle includes flasher lights, and wherein the authorization acknowledgement is realized by energizing the flasher lights.

5. The method of claim 1, wherein said step (c) includes transmitting the identification code to the law enforcement unit.

6. The method of claim 5, further comprising the step of transmitting the identification code from the law enforcement unit to the central database station.

7. The method of claim 1, wherein said step (c) includes transmitting the identification code to the law enforcement unit.

8. The method of claim 1, further comprising the step of activating a horn in the suspect vehicle after receipt of the stop command signal by the vehicle control unit.

9. The method of claim 8, further comprising the step of transmitting a reset signal from the law enforcement unit to the vehicle control unit to deactivate the horn.

10. The method of claim 1, wherein the suspect vehicle has an engine and said step (m) includes putting the engine in an idle condition.

11. The method of claim 1, further comprising the step of encrypting the transmission of the first vehicle authorization code to the vehicle control unit.

12. The method of claim 1, further comprising the step of encrypting the second vehicle authorization code before storing it in the vehicle control unit.

13. The method of claim 1, wherein said step (i) includes enabling the vehicle control unit to receive the stop command signal for a pre-determined period.

14. The method of claim 13, wherein the predetermined period has a duration of up to 35 seconds.

15. The method of claim 1, further comprising the step of transmitting a reset signal from the law enforcement unit to the vehicle control unit to re-enable operation of the suspect vehicle after being disabled in said step (m).

16. The method of claim 1, wherein the suspect vehicle is an automobile.

17. A method of verifying and disabling a suspect vehicle observed by a law enforcement officer, said method employing a central database station and a law enforcement unit associated with the law enforcement officer, said method comprising the steps of:

(a) the law enforcement officer observing the suspect vehicle within a transmitting and receiving range of the law enforcement unit;

(b) the law enforcement officer transmitting an inquiry signal from the law enforcement unit within the transmitting and receiving range;

(c) the law enforcement unit receiving a plurality of identification codes from a plurality of vehicles, respectively, within the transmitting and receiving range, each of the identification codes being associated with a different one of the plurality of vehicles, each of the plurality of vehicles containing a vehicle control unit, the identification codes being transmitted from the vehicle control units to the law enforcement unit in response to the inquiry signal, the suspect vehicle being one of the plurality of vehicles;

(d) relaying the identification codes of the plurality of vehicles from the law enforcement unit to the central database station, each of the identification codes being associated with a different vehicle authorization code stored at the central database station;

(e) identifying the vehicle authorization codes associated with the identification codes, respectively;

(f) transmitting the vehicle authorization codes from the central database station to the law enforcement unit;

(g) displaying a list of the plurality of vehicles on a display screen for viewing by the law enforcement officer;

(h) selecting one of the plurality of vehicles listed on the display screen;

(i) transmitting the vehicle authorization code associated with the vehicle selected in step (h), from the law enforcement unit to the vehicle control unit of the selected vehicle;

(j) comparing the vehicle authorization code transmitted in step (i) with a vehicle authorization code pre-stored in the vehicle control unit of the selected vehicle;

(k) generating an authorization acknowledgment at the selected vehicle if there is a match between the transmitted vehicle authorization code and the vehicle authorization code pre-stored in the selected vehicle;

(l) enabling the vehicle control unit of the selected vehicle to receive a stop command signal if there is a match between the transmitted vehicle authorization code and the vehicle authorization code pre-stored in the selected vehicle;

(m) the law enforcement officer observing the authorization acknowledgment and verifying whether the selected vehicle is the suspect vehicle;

(n) repeating steps (h) through (m) with respect to a different one of the plurality of vehicles listed on the display screen, until the selection of the suspect vehicle is verified in step (m);

(o) the law enforcement officer transmitting a stop command signal from the law enforcement unit in response to an authorization acknowledgment from the suspect vehicle;

(p) receiving the stop command signal at the vehicle control unit of the suspect vehicle; and (q) disabling operation of the suspect vehicle in response to the stop command signal.

18. The method of claim 17, wherein each of the plurality of vehicles includes flasher lights, and wherein the authorization acknowledgement of step (k) is realized by energizing the flasher lights.

19. The method of claim 17, further comprising the step of activating a horn in the suspect vehicle after the vehicle control unit receives the stop command signal.

20. The method of claim 17, wherein the suspect vehicle has an engine and said step (q) includes putting the engine in an idle condition.

* * * * *